(12) United States Patent
Hamada et al.

(10) Patent No.: US 8,249,276 B2
(45) Date of Patent: Aug. 21, 2012

(54) INFORMATION PROCESSOR AND CONTROLLER DEVICE

(75) Inventors: Koji Hamada, Tokyo (JP); Toru Akazawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1233 days.

(21) Appl. No.: 11/665,728

(22) PCT Filed: Aug. 14, 2006

(86) PCT No.: PCT/JP2006/316010
§ 371 (c)(1),
(2), (4) Date: Jul. 3, 2007

(87) PCT Pub. No.: WO2007/032173
PCT Pub. Date: Mar. 22, 2007

(65) Prior Publication Data
US 2007/0248235 A1    Oct. 25, 2007

(30) Foreign Application Priority Data

Sep. 15, 2005  (JP) .................................. 2005-268425
Sep. 15, 2005  (JP) .................................. 2005-268426

(51) Int. Cl.
*H03G 5/00*    (2006.01)
*A63F 9/24*    (2006.01)
*A63F 13/00*   (2006.01)
*G06F 17/00*   (2006.01)
*G06F 19/00*   (2011.01)

(52) U.S. Cl. ........................................... 381/99; 463/37

(58) Field of Classification Search .................... 381/99; 463/37, 38, 36, 30
See application file for complete search history.

(56) References Cited

U.S. PATENT DOCUMENTS

| | | | |
|---|---|---|---|
| 6,306,039 B1 * | 10/2001 | Kaji et al. | 463/42 |
| 6,524,188 B2 * | 2/2003 | Wang | 463/37 |
| 6,645,076 B1 | 11/2003 | Sugai | |
| 6,803,676 B2 | 10/2004 | Tanaka et al. | |
| 2001/0049302 A1 | 12/2001 | Hagiwara et al. | |
| 2002/0004423 A1 | 1/2002 | Minami et al. | |
| 2002/0105229 A1 | 8/2002 | Tanaka et al. | |
| 2004/0235566 A1 * | 11/2004 | Hussaini et al. | 463/37 |
| 2006/0111187 A1 | 5/2006 | Miyazaki | |

FOREIGN PATENT DOCUMENTS

| | | |
|---|---|---|
| JP | 6-205010 | 7/1994 |
| JP | 7-265546 | 10/1995 |
| JP | 11-024776 | 1/1999 |
| JP | 11-24776 | 1/1999 |

(Continued)

OTHER PUBLICATIONS

International Search Report dated Nov. 7, 2006 from the corresponding PCT/JP2006/316010.

(Continued)

*Primary Examiner* — Hai Phan
(74) *Attorney, Agent, or Firm* — Katten Muchin Rosenman LLP

(57) ABSTRACT

A controller device is provided whereby players can experience realistic sounds. The controller device is connected to the main body of an information processing apparatus, wherein the controller device comprises a first speaker for emitting a sound signal in a low frequency range, and a second speaker for emitting a sound signal in a frequency range that is higher in comparison with the first speaker.

7 Claims, 7 Drawing Sheets

FOREIGN PATENT DOCUMENTS

| | | |
|---|---|---|
| JP | 11-114223 A | 4/1999 |
| JP | 11-207027 A | 8/1999 |
| JP | 2000-140411 A | 5/2000 |
| JP | 2001-327754 | 11/2001 |
| JP | 2002-218558 | 8/2002 |
| JP | 2003-210834 A | 7/2003 |
| JP | 2004-128669 A | 4/2004 |
| JP | 2004-329300 | 11/2004 |

OTHER PUBLICATIONS

Japanese Office Action dated Mar. 4, 2008, from the corresponding Japanese Application.

Notice of Rejection dated Mar. 29, 2011, from corresponding Japanese Application No. 2005-268425.

\* cited by examiner

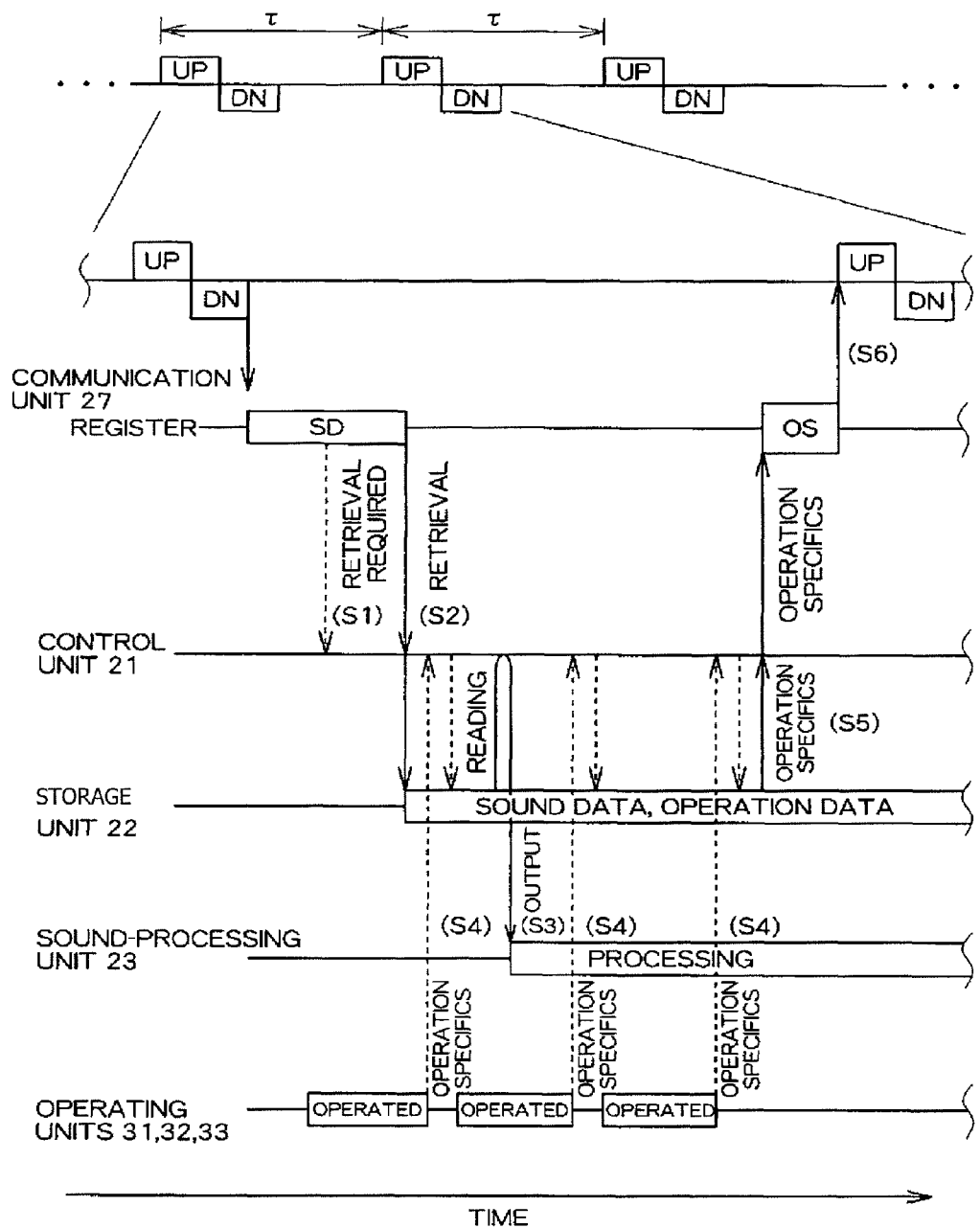

INFORMATION PROCESSOR AND CONTROLLER DEVICE

This application is a National Phase Application of International Application No. PCT/JP2006/316010, filed Aug. 14, 2006, which claims the benefit under 35 U.S.C. 119 (a-e) of Japanese Application No. 2005-268425 filed Sep. 15, 2005, and Japanese Application No. 2005-268426 filed Sep. 15, 2005, which are herein incorporated by reference.

TECHNICAL FIELD

The present invention relates to an information processing apparatus for a home gaming console or the like, and to a controller device that is connected to the console and used to operate the console.

BACKGROUND ART

Various examples of controller devices for home gaming consoles, for example, have been proposed in the past. Among these are devices that are equipped with a vibrating motor, wherein the controller device is vibrated by an instruction from the main body (Gazette U.S. Pat. No. 6,645,076).

DISCLOSURE OF THE INVENTION

However, although conventional controller devices can be vibrated, they cannot be made to emit sounds. Sounds are simply emitted by the television to which the gaming console is connected, and it has not been possible for players to experience realistic sounds.

Controller devices have been proposed that include a speaker for causing the controller device to emit sounds to provide players with realistic sounds. In this case, it is sometimes not possible to ensure space in the controller device for installing a vibrating motor. Therefore, it has not been possible to comply with vibration instructions in conventional application programs that are developed on the premise that a vibrating motor will be included.

The present invention was designed in view of these circumstances, and an object thereof is to provide a controller device that can provide realistic sounds to each player holding the controller.

Another object of the present invention is to provide a controller device including at least one speaker, and an information processing apparatus connected to the controller device, wherein compatibility can be maintained with conventional application program processes.

MEANS FOR SOLVING THESE PROBLEMS

One aspect of the present invention is a controller device that is connected to a main body of an information processing apparatus, and that comprises a first speaker for producing sound signals in a low frequency range, and a second speaker for producing sound signals in a frequency range that is higher in comparison with the first speaker.

Another aspect of the present invention is an information processing apparatus connected to a controller device comprising at least one speaker, the information processing apparatus further comprising means for generating a sound signal on the basis of a vibrating instruction command that is to be outputted to a controller provided with a vibrating device, and means for outputting the generated sound signal to the controller device, and the sound signal is supplied to control the emission of sounds by the one or more speakers.

BRIEF DESCRIPTION OF THE DRAWINGS

FIG. 5 is a flowchart showing an example of the communication process between a controller device and a game console according to an embodiment of the present invention;

BEST MODE FOR CARRYING OUT THE INVENTION

Figure 1:
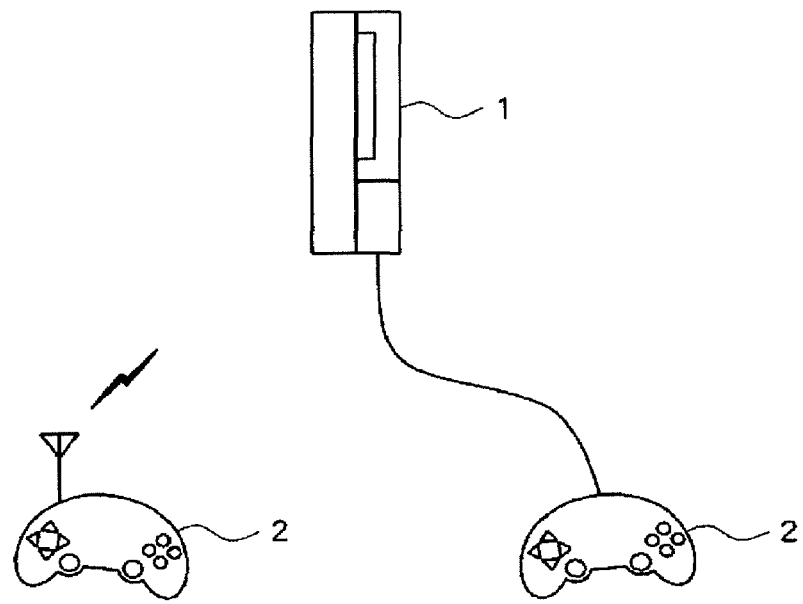
FIG. 1 is a schematic view showing an example of a game system that uses the controller device according to an embodiment of the present invention.

An embodiment of the present invention will now be described with reference to the diagrams. A game console 1 as an information processing apparatus according to the present embodiment, and at least one controller device 2 connected to the console, are wiredly or wirelessly connected to each other as shown in FIG. 1.

Figure 2:
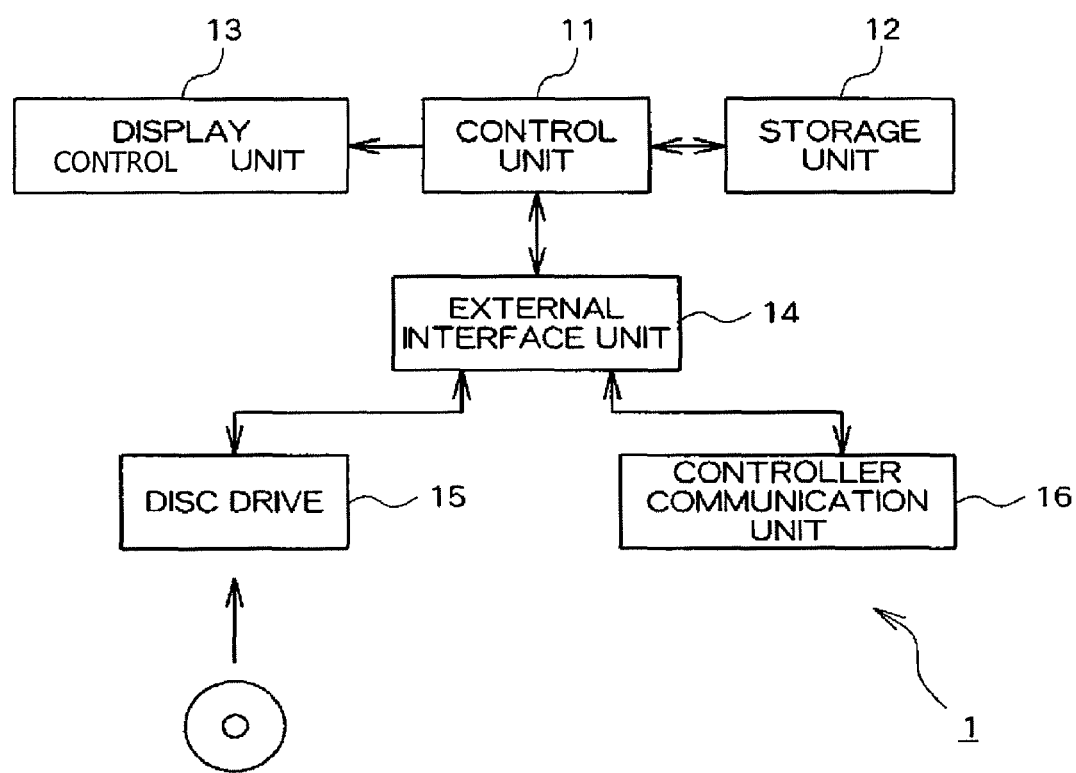
FIG. 2 is a structural block diagram showing an example of the game system for controlling the controller device according to an embodiment of the present invention.

The game console 1 has a control unit 11, a storage unit 12, a display control unit 13, an external interface unit 14, a disc drive 15, and a controller communication unit 16, as shown in FIG. 2.

Figure 3:
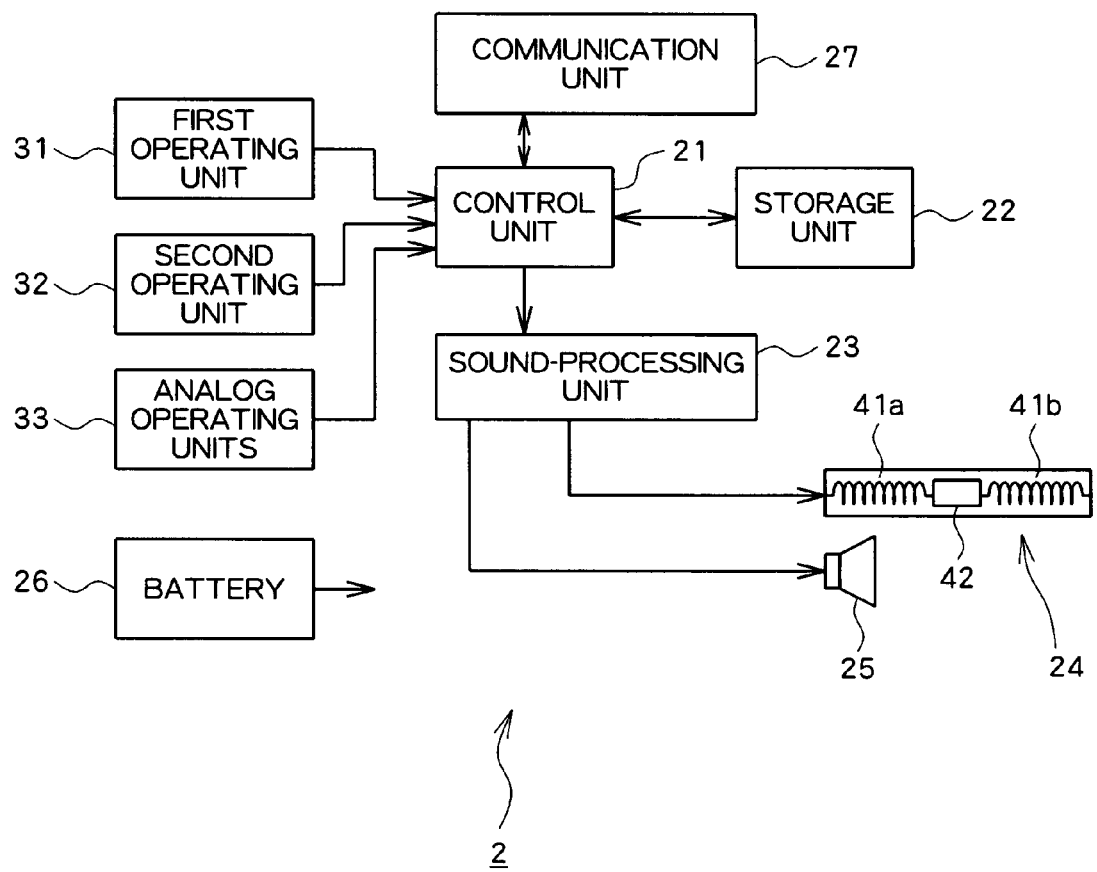
FIG. 3 is a structural block diagram showing an example of the controller device according to an embodiment of the present invention.

The controller device 2 is equipped with a control unit 21, a storage unit 22, a sound-processing unit 23, a woofer speaker 24, a tweeter speaker 25, a battery 26, and a communication unit 27, and has first and second operating units 31, 32 as well as analog operating units 33 in the form of operating buttons, as shown in FIG. 3.

The control unit 11 of the game console 1 is, e.g., a processor chip. Programs (applications, game programs, and other programs executed with a personal computer, for example), which are read from an external storage medium loaded into the disc drive 15, are stored in the storage unit 12 and executed. An example of the specifics of the operation of the control unit 11 of the present embodiment will be described in detail later.

The storage unit 12 has RAM (random access memory) or another such storage element, and retains programs executed by the control unit 11. The storage unit 12 also operates as working memory for retaining data that is needed for the processes of the control unit 11.

The display control unit 13 is a graphics processing board or the like, and the display control unit creates images according to instructions inputted from the control unit 11, and outputs information on the created images to a display (television screen or the like) connected externally, where the images are displayed.

The external interface unit 14 is a so-called bridge chip connected to the control unit 11, the disc drive 15, and the controller communication unit 16. The external interface unit 14 obeys commands inputted from the control unit 11, and selects the destination of the signals (output signals) that are outputted by the control unit 11, and selectively outputs the output signals of the control unit 11 to selected destinations. The external interface unit 14 also outputs signals inputted from the disc drive 15 or controller communication unit 16 to the control unit 11.

The disc drive 15 reads recorded information from a Blu-ray Disc, DVD, or another such disc, for example, and outputs the information to the control unit 11 via the external interface unit 14.

The controller communication unit 16 establishes a wired or wireless communicable connection with the controller device 2 either, and supplies the control unit 11 with information indicating the specifics of the user's operations inputted from the controller device 2. The controller communication unit 16 also provides the controller device 2 with data or the like indicating sounds to be emitted according to instructions inputted from the control unit 11. The controller communication unit 16 periodically communicates with the controller device 2, as will be demonstrated later. The timing with which signals are sent to each controller device 2 is scheduled differently, and communication with multiple controller devices 2 is performed with time-division multiplexing.

Figure 4:
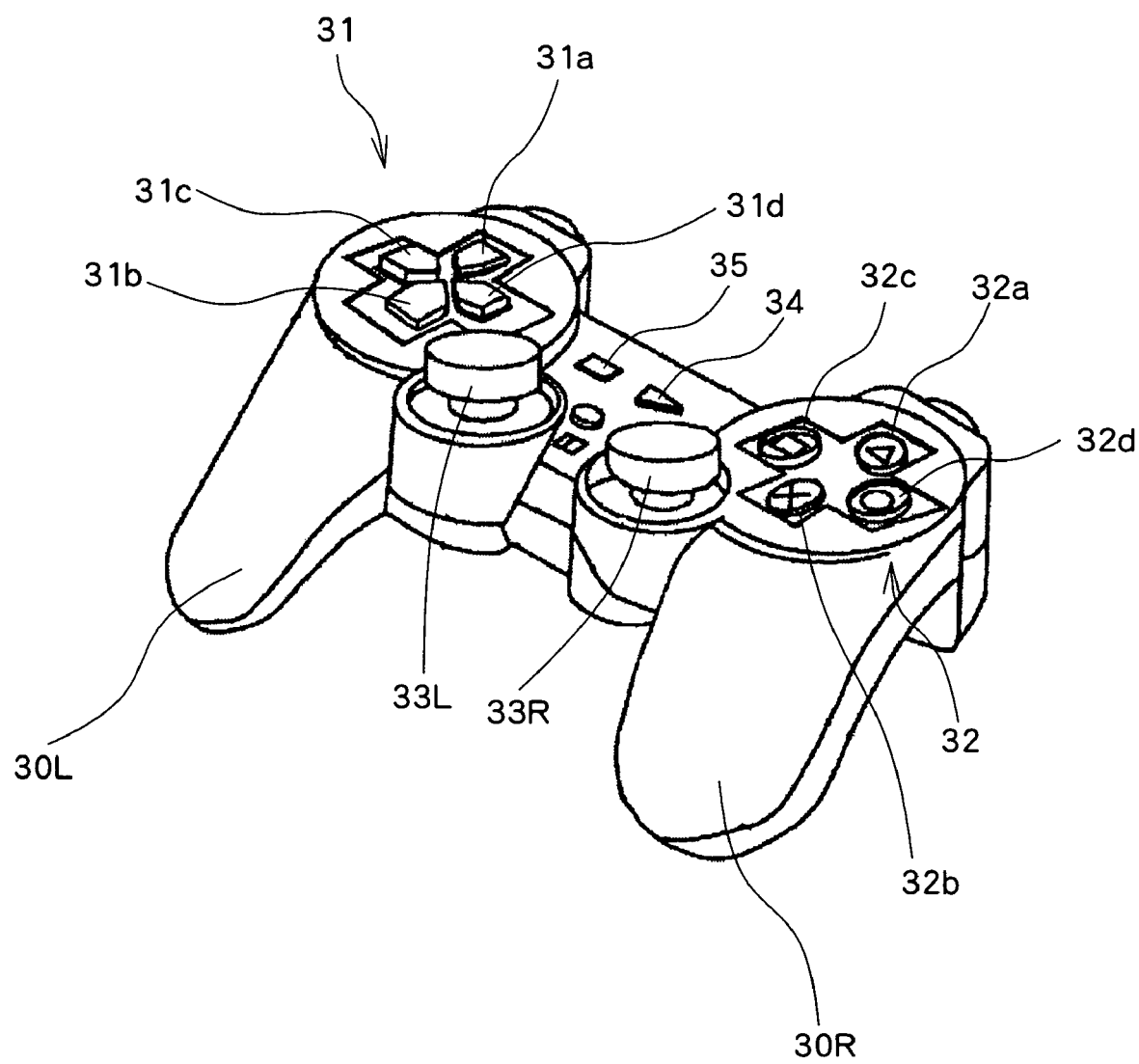
FIG. 4 is a perspective view showing an example of the external appearance of the controller device according to an embodiment of the present invention.

The controller device 2 has an outward appearance such as is shown in FIG. 4, for example, and has grips 30R, 30L. The user holds the grips 30 in their left and right hands. The first and second operating units 31, 32 and the analog operating units 33R, 33L are provided to positions in which the units can be operated with the thumbs while the user is holding the grips 30.

The first operating unit 31 is provided with an up-directional command key 31a, a down-directional command key 31b, a right-directional command key 31d, and a left-directional command key 31c. The user specifies the operational objects on the screen, for example, by using these command keys 31a, 31b, 31c, and 31d. The second operating unit 32 is provided with a triangle button 32a having a symbol in the shape of a triangle (Δ), an X button 32b having a symbol in the form of the letter X (X), a circle button 32d having a symbol in the shape of a circle (○), and a square button 32c having a symbol in the shape of a square (□). These buttons 32a, 32b, 32c, and 32d are assigned respective operation specifics in accordance with the operational objects specified with the command keys 31a, 31b, 31c, and 31d, for example. The user can thereby perform operations corresponding to the operational objects specified with the command keys 31a, 31b, 31c, and 31d by selectively pressing the appropriate buttons 32a, 32b, 32c, and 32d.

The analog operating units 33R, 33L can be tilted, and can also be rotated while tilted. The analog operating units 33R, 33L are designed to stand erect (without tilt) and to maintain their positions (basic position) when they are not tilted. When the analog operating unit 33R or analog operating unit 33L is tilted while being pushed, the coordinate values (x, y) are detected in xy coordinates corresponding to the amount and direction of tilt from the standard position, and the coordinate values are outputted to the control unit 21 as operation outputs.

The controller device 2 also has a start button 34 for instructing the game console 1 to execute the game program, and a select button 35 for switching among various modes and performing other such functions.

The control unit 21 of the controller device 2 is a microcomputer or the like, and the control unit operates according to programs stored in the storage unit 22. The control unit 21 receives information related to the user's operations for the first and second operating units 31, 32 as well as the analog operating units 33, which are operating buttons, and outputs information indicating these operations to the game console 1 via the communication unit 27.

The control unit 21 controls the sounds emitted by the woofer speaker 24 and tweeter speaker 25 according to instructions received from the game console 1 via the communication unit 27. The process of controlling the emission of sounds is described in detail later.

The storage unit 22 has RAM and ROM, and programs executed by the control unit 21 are retained in the ROM, for example. The storage unit 22 also operates as working memory for the control unit 21.

The sound-processing unit 23 has a D/A converter (DAC), a filter (analog filter), an amplifier, and the like. The sound-processing unit generates sound signals on the basis of data inputted from the control unit 21, and outputs the generated sound signals to at least one of the woofer speaker 24 and tweeter speaker 25.

The woofer speaker 24 corresponds to the first speaker of the present invention, and emits sound signals of a relatively low frequency range from among the sound signals outputted by the sound-processing unit 23. The woofer speaker 24 includes a weight 42 supported on both sides by two elastic members 41a, 41b, and this weight may be movably controlled in accordance with the sound signals by electromagnetic action in the direction of the elastic force of the elastic members 41, as shown in FIG. 3, for example. Using the woofer speaker 24 having the configuration shown in FIG. 3 makes it possible to reduce the size and to improve reproducibility characteristics in low frequency ranges.

The tweeter speaker 25 corresponds to the second speaker of the present invention, and the speaker emits sound signals of a relatively higher frequency range than the woofer speaker 24 from among the sound signals outputted by the sound-processing unit 23. The battery 26 supplies power to all units when the controller device 2 is wirelessly connected. The battery 26 may be a secondary battery, for example.

The communication unit 27 establishes wired or wireless communication with the game console 1, and receives sound signals from the game console 1 and other such instructions pertaining to sounds that are to be emitted by the controller device 2, and holds the received instructions in a buffer. The communication unit then outputs the instructions to the control unit 21 from the buffer according to instructions inputted from the control unit 21. The communication unit 27 also receives information pertaining to the user's operation specifics inputted from the control unit 21, and outputs this information to the game console 1.

In the present embodiment, communication between the game console 1 and the controller device 2 is conducted by the periodic exchange of data packets that include downstream (from the game console 1 to the controller device 2) signals and upstream (from the controller device 2 to the game console 1) signals (UP), as shown in FIG. 5. The data included in the downstream signals (DN) is downloaded and retained in the register of the communication unit 27. The communication unit 27 then issues read requirements for the control unit 21 (S1). The control unit 21 retrieves sound data from the register of the communication unit 27 and stores the data into the working memory (S2). Sound data (SD) components that are sufficient for continuing to emit the sounds are then outputted from the stored sound data to the sound-processing unit 23 during the communication cycle (S3).

Data that pertains to the user's operation of the operating units 31, 32 and the analog operating units 33 (Operation Specifies: OS) is stored into the working memory of the control unit 21 (S4), and is written from the working memory into the buffer of the communication unit 27 at a specific timing (S5). The communication unit 27 sends this signal to the game console 1 with the communication timing of next upstream signal (S6).

In the present embodiment, the game console 1 may send sound data that is sufficient to continue to emit sounds during a time period that exceeds this communication cycle. In this case, the controller device 2 may retain the sound data in the storage unit 22 or the like. In cases in which sound data is not transferred during communication from the game console 1 (either downstream signals are not received for some reason, or there are large amounts of other data and a sufficient amount of sound data cannot be received), sound reproduction is continued using the sound data stored in the storage unit 22.

Figure 6A:
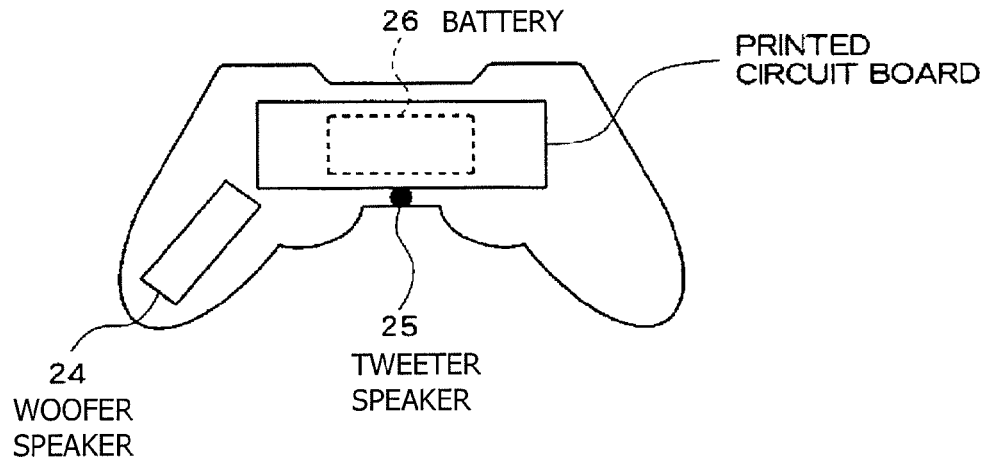
FIG. 6 is a schematic explanatory diagram showing an example of the internal arrangement of the controller device according to an embodiment of the present invention.
Figure 6B:
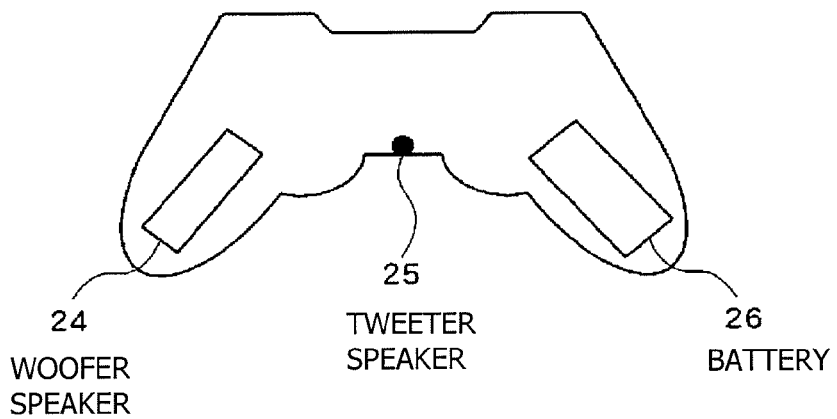
Figure 6C:
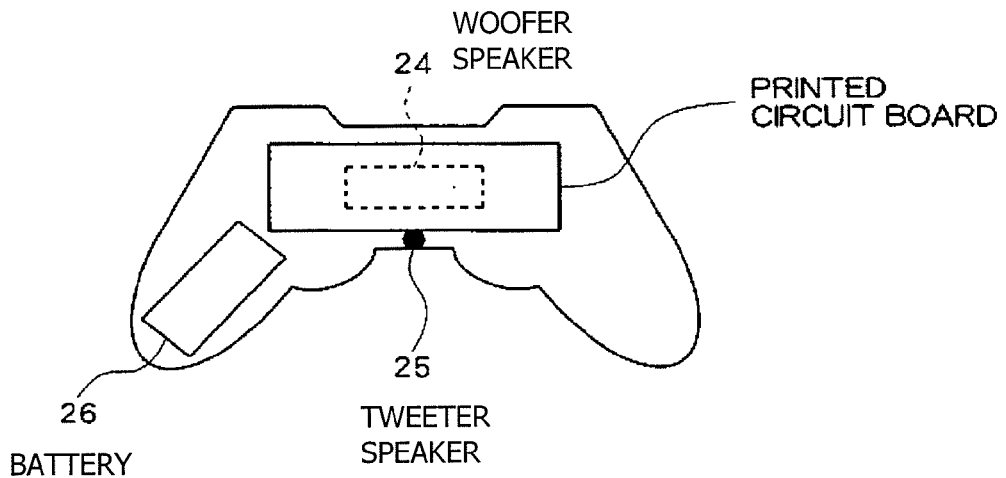

The units housed in the controller device 2 may be designed such that the woofer speaker 24 is disposed in one of the grips 30, the battery 26 and a printed circuit board on which the control unit 21 and storage unit 22 are mounted are disposed in the middle of the controller device 2, and the tweeter speaker 25 is disposed in the middle of the near side of the controller device 2 (FIG. 6A), as in the examples shown in FIGS. 6A through 6C. Instead of this arrangement, another option is to store the battery 26 in the grip 30 on the opposite side of the woofer speaker 24 (FIG. 6B). FIG. 6B shows an example in which the battery 26 is housed in the right grip 30R of the controller device 2, but the left and right arrangements may be reversed. In other words, the battery 26 may be housed in the left grip 30L of the controller device 2. Furthermore, the positions of the battery 26 in FIG. 6A and the woofer speaker 24 may be reversed (FIG. 6C). FIG. 6A through FIG. 6C are schematic perspective views of the interior of the controller device 2 in FIG. 4 when seen in a plan view.

Figure 7:
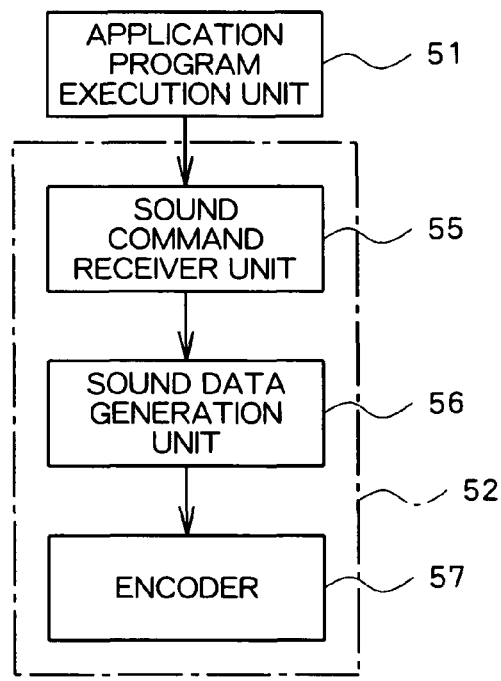
FIG. 7 is a function block diagram showing an example of a game console for controlling the controller device according to an embodiment of the present invention.

The functional configuration of the game console 1 for causing the controller device 2 to emit sounds includes a game application program execution unit 51, and a driver program execution unit 52, as shown in FIG. 7. The driver program execution unit 52 has a sound command receiver unit 55, a sound data generation unit 56, and an encoder 57.

Figure 8:
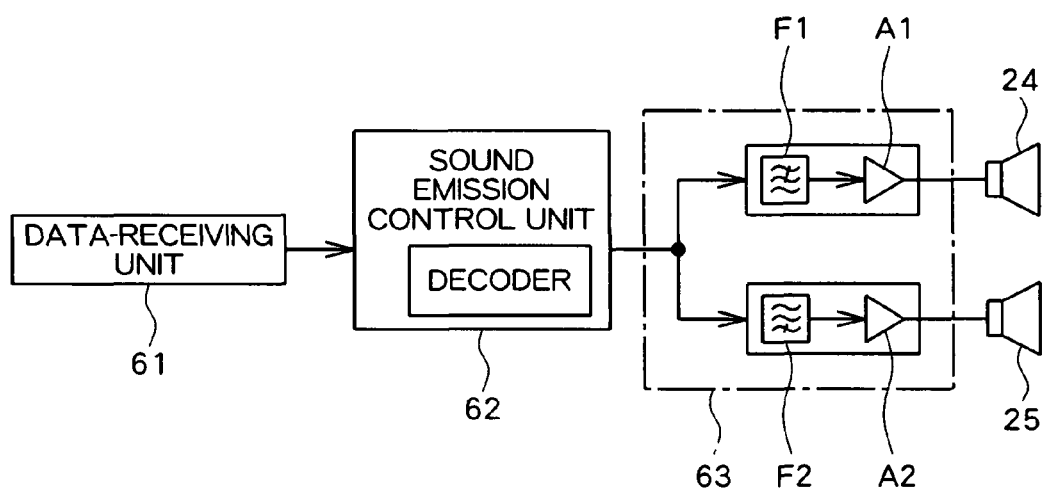
FIG. 8 is a function block diagram showing an example of the controller device according to an embodiment of the present invention.

The controller device 2 functionally includes a data-receiving unit 61, a sound emission control unit 62, and a sound emission unit 63, as shown in FIG. 8. The sound emission unit 63 has an analog circuit that includes a filter F and an amplifier A in correspondence with the woofer speaker 24 and tweeter speaker 25, respectively.

The program executed herein by the application program execution unit 51 of the game console 1 is a game program or the like, wherein a sound command for instructing sounds to be emitted by the controller device 2 is outputted to the driver program execution unit 52. Low-pitch sound waveform data and high-pitch sound waveform data, for example, are specified in this sound command.

The sound command receiver unit 55 of the driver program execution unit 52 receives the sound command inputted from the application program execution unit 51, and outputs the command to the sound data generation unit 56. The sound data generation unit 56 combines the low-pitch sound waveform data and the high-pitch sound waveform data specified by the inputted sound command and generates composite waveform data. This combination may be a process of adding to mix the waveform data.

The encoder 57 encodes and outputs the composite waveform data generated by the sound data generation unit 56. The signals outputted by the encoder 57 are sent to the controller device 2 via the controller communication unit 16.

The data-receiving unit 61 of the controller device 2 outputs to the sound emission control unit 62 the encoded composite waveform data received from the game console 1.

The sound emission control unit 62 has a decoder for decoding the encoded composite waveform data received by the data-receiving unit 61. The sound emission control unit 62 retrieves the composite waveform data decoded by the decoder. The decoding process of the decoder may be performed by the control unit 21, or may be performed by utilizing the hardware in the sound-processing unit 23 separately from the control unit 21. The sound emission control unit 62 furthermore converts the composite waveform data from digital to analog format to generate an analog signal, and outputs the signal to the sound emission unit 63.

The sound emission unit 63 can be implemented as a function of the sound-processing unit 23. The sound emission unit 63 outputs the analog signal outputted by the sound emission control unit 62 as a common signal source to the analog circuits provided in correspondence with the woofer speaker 24 and tweeter speaker 25. The analog circuit provided in correspondence with the woofer speaker 24 includes a first filter F1 for removing frequency components that exceed a specific cutoff frequency, and a first amplifier A1 for amplifying signal that have passed through the first filter F1 and outputting the signal to the woofer speaker 24.

The analog circuit provided in correspondence with the tweeter speaker 25 includes a second filter F2 that passes through at least a specific frequency range, and a second amplifier A2 for amplifying signal that have passed through the second filter F2 and outputting the signal to the tweeter speaker 25.

The cutoff frequency f1 for the first filter F1 and the lower limit frequency f2 of the range transmitted by the second filter F2 may be determined as $f1 \leq f2$. Sounds that are less than a specific frequency are thereby mainly emitted by the woofer speaker 24, and the tweeter speaker 25 can be prevented from emitting these sounds.

The woofer speaker 24 and the tweeter speaker 25 are caused to emit sounds by signals amplified, respectively, by the first amplifier A1 and second amplifier A2 of the sound emission unit 63.

[Modified Example Sound Signals]

In the descriptions so far, the application program execution unit 51 in the game console 1 generated sound waveform signal or issued instructions, and encoded and sent out the signal. However, the instructions for emitting sound that are sent from the game console 1 to the controller device 2 are not limited to this option alone.

In the game console 1, for example, multiple pieces of waveform data may be correlated with characteristic waveform identifiers and stored in advance in the storage unit 12 or the like. The waveform data stored in correlation with the waveform identifiers specified by the application program execution unit 51 may be encoded and sent out. In this case, the input of sound waveform signals may be received from the application program execution unit 51, at which time the waveform signals indicated by the waveform data can be mixed and combined with the sound waveform signal and then encoded.

Furthermore, the waveform data may be encoded waveform data. In this case, the waveform data, which is retained in correlation with the waveform identifiers specified by the application program execution unit 51, can be sent without being modified in any way. In cases in which the input of sound waveform signal is also received from the application program execution unit 51, the sound waveform signal inputted from the application program execution unit 51 are encoded, and the encoded waveform data is sent after multiplexing. In such a case of multiplexing, the encoded waveform data and the encoded sound waveform signal are separated from the multiplexed data in the controller device 2, and are then decoded and combined.

When the waveform data is prepared in advance in this manner, sounds (of footsteps, gunfire, or the like) to be outputted in synchronization with the actions of the character in the game, for example, can easily be synchronously controlled, because there is no need for the sound waveform signals to be outputted from the application program execution unit 51 to the device driver. Providing recurring sound effects or the like as waveform data also makes it possible to easily develop the application program. The waveform data referred to herein may be data having frequency characteristics that correspond to each of the speakers provided to the controller device 2, such as data pertaining to sounds that are to be primarily emitted by the woofer speaker 24 (data primarily containing frequency components that pass through the first filter F1 but are blocked by the second filter F2), and data pertaining to sounds that are to be primarily emitted by the tweeter speaker 25 (data primarily containing frequency components that are blocked by the first filter F1 but pass through the second filter F2).

Furthermore, the sound data sent from the game console 1 to the controller device 2 may be divided among multiple channels, as in the case of stereo sound. Signals for a left channel (Lch) and a right channel (Rch) may be included, for example.

In this case, the sounds to be emitted by the woofer speaker 24 and the tweeter speaker 25 may be signals on different channels. Specifically, in this example, the sound signals on the different channels are signal sources corresponding respectively to the woofer speaker 24 and the tweeter speaker 25. In this arrangement, the sound signal on a channel specified in advance as the signal for the woofer speaker 24 (the Lch sound signal, for example) are filtered and amplified via the first filter F1 and the first amplifier A1, and are then outputted to the woofer speaker 24 in the sound emission unit 63 of the controller device 2. Similarly, the sound signal on a channel specified in advance as signal for the tweeter speaker 25 (Rch sound signal, for example) are filtered and amplified via the second filter F2 and the second amplifier A2, and are then outputted to the tweeter speaker 25. In this example, only the low-pitch sound unit (woofer speaker 24), for example, emits sounds, causing the casing of the controller device 2 to resonate; only the medium/high-pitch sound unit (tweeter speaker 25) emits sounds, causing light sounds. In addition to the method of using sound signals on multiple channels in this manner, the following method has also been considered as a configuration for selectively causing sounds to be emitted by multiple speakers included in the controller device 2.

Specifically, the control unit 11 of the game console 1 presents the controller device 2 with speaker-indicating information that specifies the speaker that is to emit sounds, and the sound-processing unit 23 of the controller device 2 outputs sound signal only to the speaker specified by the speaker-indicating information. For example, the control unit 11 of the game console 1 sends out speaker-indicating information that specifies the woofer speaker 24. The control unit 21 of the controller device 2 outputs the speaker-indicating information to the sound-processing unit 23. The sound-processing unit 23 outputs sound signal received from the game console 1 to the speaker (the woofer speaker 24 in this example) that is specified by the inputted speaker-indicating information. In other words, the sound signals in this example are outputted to the woofer speaker 24 via the first filter F1 and first amplifier A1, but are not outputted to the second filter F2, and the tweeter speaker 25 is therefore controlled so as to not emit sounds.

Furthermore, the sound-processing unit 23 of the controller device 2 may include a function (synthesizer) for generating sound signals on the basis of music signals (musical performance information including note intervals, note length, note intensity, note variety, effects of tone quality, and other such information) specified as MIDI (Musical Instruments Digital Interface) standards, for example. One specific example of a MIDI musical signal is an SMF (Standard MIDI File). The synthesizer is made to emit sounds on the basis of this performance information in the sound-processing unit 23 of the controller device 2. Widely known chips used to cause portable phones to emit ringtones, for example, can be used for such a synthesizer.

In the sound-processing unit 23 having this synthesizer, the sound signals generated by the synthesizer are mixed with the sound signal sent from the game console 1, and the resulting signal is outputted to the analog circuits connected to the woofer speaker 24 and the tweeter speaker 25. In cases in which sounds are emitted selectively, the signal is outputted to the analog circuit corresponding to the specified speaker.

In the controller device 2, multiple pieces of waveform data may also be retained in advance in the storage unit 22 in correlation with characteristic waveform identifiers. The game console 1 presents the controller device 2 with waveform identifiers corresponding to the waveform data that is to be emitted as a sound. The control unit 21 of the controller device 2 combines (mixes) this waveform data with the sound data received from the game console 1 and outputs the resulting data to the sound-processing unit 23.

As described above, the various configurations can be used in the present embodiment, such as the following.

(1) The sound waveform data not encoded in the game console 1 is generated and retained by the application program execution unit 51, and this data is encoded and sent out.

(2) The sound waveform data not encoded in the game console 1 is retained in advance so as to be usable by the device driver, and the application program execution unit 51 outputs instructions (including information specifying the sound waveform data that is to be emitted as a sound in the case of multiple pieces of data) to the device driver to emit the retained sound waveform data as a sound. The data is encoded and sent out by the device driver.

(3) The sound waveform data encoded in the game console 1 is retained in advance so as to be usable by the device driver, and the application program execution unit 51 outputs instructions (including information specifying the sound waveform data that is to be emitted as a sound in the case of multiple pieces of data) to the device driver to emit the retained sound waveform data as a sound. The device driver sends out the sound waveform data in accordance with these instructions.

(4) The controller device 2 has a configuration for generating sound signals based on music signals such as MIDI signals or the like. Music signals are sent from the game console 1, and sound signals are generated in the controller device 2 on the basis of the music signals received from the game console 1.

(5) The sound waveform data not encoded in the game console 1 is retained, and the game console 1 outputs instructions (including information specifying the sound waveform data that is to be emitted as a sound in the case of multiple pieces of data) so that the sound waveform data retained in the controller device 2 is emitted as a sound. The controller device 2 outputs sound signals based on the sound waveform data.

Synthesized sounds can be produced by combining the above approaches, examples of which include adding together or otherwise processing data values belonging to data pairs that have not yet been encoded, and mixing voice signals by using an analog mixer.

In cases in which, for example, only MIDI signals are used, a D/A converter is not absolutely needed in the controller device 2.

[Converting Vibration Commands]

There are also application programs for games designed for controllers having an internally disposed vibrating device. In view of this, the game console 1 of the present embodiment may be designed so that vibration instructions for the vibrating device are converted into sound signals, and sounds are emitted via the woofer speaker 24 of the controller device 2, for example.

Figure 9:
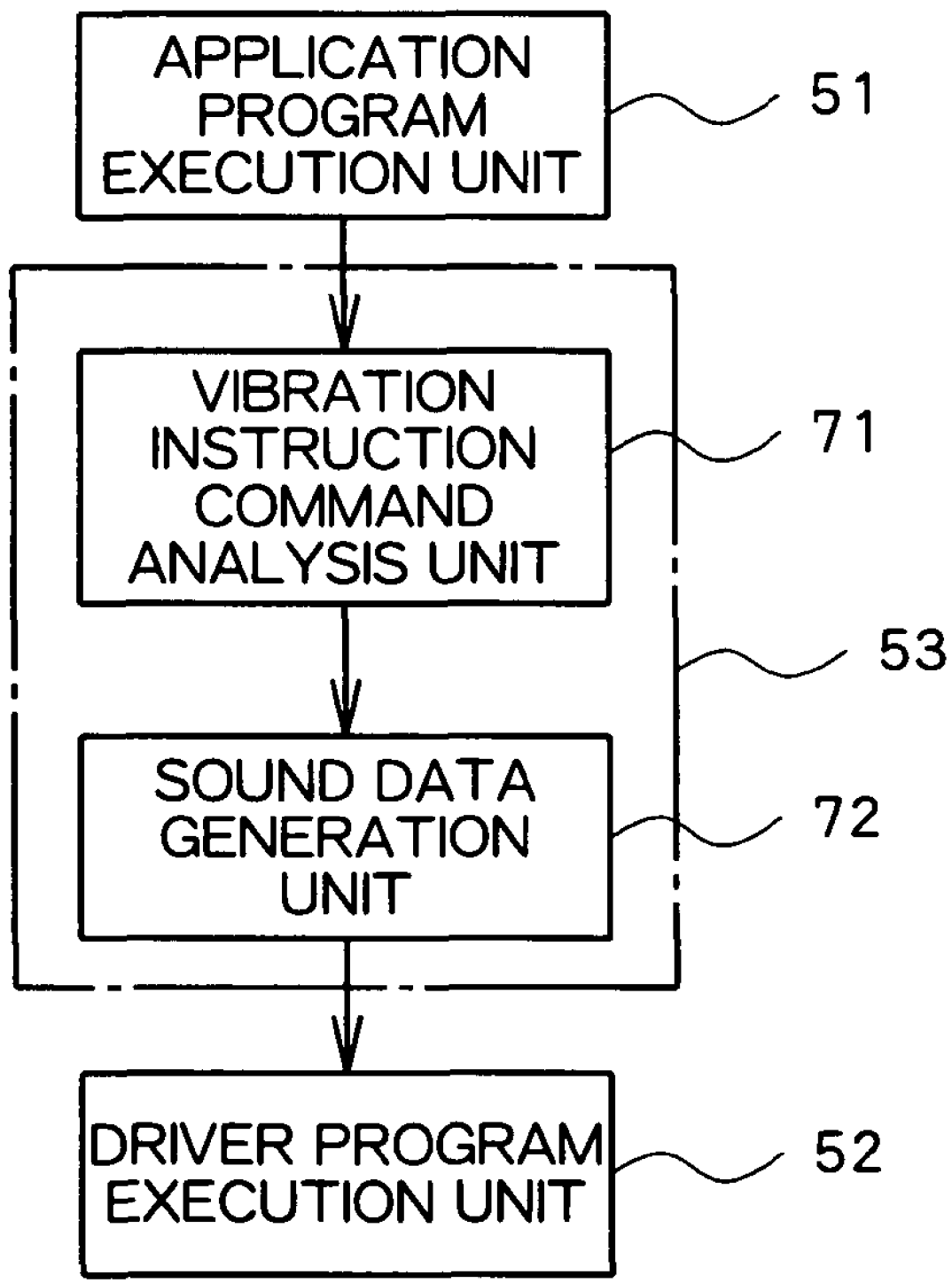
FIG. 9 is a function block diagram showing an example of a specified processing time in the game console for controlling the controller device according to an embodiment of the present invention.

The functional configuration of the game console 1 in this case includes a game application program execution unit 51, a vibration-converting unit 53, and a driver program execution unit 52, as shown in FIG. 9. Components having the same configurations as those in FIG. 7 are denoted by the same numerical symbols, and detailed descriptions are omitted.

In this example, the application program execution unit 51 issues vibration instruction commands to the vibrating device in accordance with the instructions included in the application program to be executed.

The vibration-converting unit 53 can be implemented as a process of the control unit 11. As an example, the vibration-converting unit 53 may have a vibration instruction command analyzer unit 71 and a sound data generation unit 72 as shown in FIG. 9. The vibration instruction command analyzer unit 71 receives a vibration instruction command issued by the application program execution unit 51, retrieves information on the vibrating mode (vibration on/off, vibration intensity, and the like) specified by the vibration instruction command, and outputs this information to the sound data generation unit 72.

The sound data generation unit 72 generates sound data on the basis of information on the vibration mode outputted by the vibration instruction command analysis unit 71. The sound data referred to herein is waveform data that corresponds to the vibrating conditions indicated by the vibration mode, for example.

The vibration-converting unit 53 outputs the generated sound data to the driver program execution unit 52. The sound data is encoded by the encoder 57 of the driver program execution unit 52 and is sent to the controller device 2. The sent data is decoded in the controller device 2 and converted into analog sound signals, the frequency range of the signals is filtered and amplified, and the second signals are then outputted to the woofer speaker 24 or the tweeter speaker 25. The vibration frequency is generally in a low frequency range, and the signals of this frequency are therefore blocked by the analog circuit provided for the tweeter speaker 25, and the tweeter speaker 25 emits less sound.

After the vibration period indicated by the vibration instruction command has passed (after control has been implemented to stop vibration), the sound data generation unit 72 of the vibration-converting unit 53 generates and outputs sound data so that sound signals continue to be emitted over a reverberation time period specified in advance. There are fewer sound signals during this reverberation time period than there are sound signals during the vibration time period indicated by the vibration instruction command. The sound volume may also be gradually reduced (gradually diminished) during this reverberation time period (i.e., waveform data that gradually diminishes in amplitude is generated so as to gradually reduce the sound volume).

In cases in which, for example, vibration is controlled based on the vibration command every $1/60$ of a second in a controller having a vibrating device, vibration control is slow to initiate due to the effects of inertia, and vibration continues without immediately stopping when vibration control ends (at the end of the vibration time period). Specifically, the vibration-converting unit 53 varies the sound volume of the sound signals on the basis of changes that occur over time in vibration control, which has been performed in the past on the basis of vibration commands.

In the control unit 11, for example, the time elapsed since the moment vibration is initiated by a vibration command is divided by $1/60$ of a second to calculate the number of times vibration control has been performed since the start of vibration. The sound volume corresponding to this number is either computed or is determined with reference to a predetermined table. Sound signals having the volume thus determined are then generated.

The control unit 11 also calculates the time elapsed after the end of a vibration based on a vibration command (the time after vibration stops). A sound volume corresponding to this time is either computed or is determined with reference to a predetermined table. Sound signals having the volume thus determined are then generated.

It is thereby possible for the vibration device to schematically recreate the act of vibration continuing due to inertia even after an instruction to stop the vibration has been issued.

Instead of calculating the number of times that vibration control has been performed, another option is to retain a history of n past vibration commands (where n is a predetermined integer), to determine the sound volume with reference to a predetermined table or the like on the basis of information about this n-time history, and to generate sound signals having the volume thus determined. When n=3, for example, a table can be designed so that the sound volume increases in the sequence "no, no, yes"; "no, yes, yes"; and "yes, yes, yes," in cases in which a vibration command is present or absent. Similarly, a table can be designed so that the sound volume decreases in the sequence "yes, yes, no" or "yes, no, no" in cases in which vibration has ended. Furthermore, corresponding sound volumes can be predetermined in cases in which vibration is periodically turned on an off, such as "no, yes, no" or "yes, no, yes."

It is described here that the process can be performed, for example, every time (every $1/60$ of a second) a command that can be inputted is issued every $1/60$ of a second, but the process may also be carried out intermittently, such as, e.g., every $1/30$ of a second. In this case, the inputted vibration commands are sampled and retrieved every $\Delta t$ seconds, for example, and sound signals that correspond to vibration commands continuously issued m times ($\Delta t/(1/60 \text{ sec})$=m times), i.e., in a period of $\Delta t$ seconds, are continuously generated based on the retrieved vibration commands. During time periods of no sampling, sound signals created based on the previously sampled vibration commands may be continually emitted as a sound.

An example was described in which sound signals were generated in the game console 1 on the basis of the vibration commands, but sound signals may also be generated in the controller device 2 on the basis of the vibration commands. In this case, the process performed by the application program execution unit 51 in the game console 1 involves issuing vibration instruction commands for the vibration device in accordance with the instructions contained in the application program to be executed, and these issued commands are sent to the controller device 2.

In the control unit 21 of the controller device 2, sound signals are generated by the same process as the vibration-converting unit 53 on the basis of the vibration instruction commands received from the game console 1. The control unit 21 may also generate and output sound data so that sound signals continue to be emitted over a predetermined reverberation time period following the end of the time period of vibration indicated by the vibration instruction commands (after control for stopping vibration has been performed). The sound signals have a lower volume during this reverberation time period than the sound signals in the vibration time period indicated by the vibration instruction commands. The sound volume may also be gradually reduced over the reverberation time period.

In cases in which, for example, vibration is controlled based on the vibration command every 1/60 of a second in a controller having a vibrating device, vibration control is slow to initiate due to the effects of inertia, and vibration continues without immediately stopping when vibration control ends (at the end of the vibration time period). Specifically, the control unit 21 varies the sound volume of the sound signals on the basis of changes that occur over time in vibration control, which has been performed in the past on the basis of vibration commands.

In the control unit 21, for example, the time elapsed since the moment vibration is initiated by a vibration command is divided by 1/60 of a second to calculate the number of times vibration control has been performed since the start of vibration. The sound volume corresponding to this number is either computed or is determined with reference to a predetermined table. Sound signals having the volume thus determined are then generated.

The control unit 21 also calculates the time elapsed after the end of a vibration based on a vibration command (the time after vibration stops). A sound volume corresponding to this time is either computed or is determined with reference to a predetermined table. Sound signals having the volume thus determined are then generated.

It is thereby possible for the vibration device to schematically recreate the act of vibration continuing due to inertia even after an instruction to stop the vibration has been issued.

Instead of calculating the number of times that vibration control has been performed, another option is for the control unit 21 to retain a history of n past vibration commands (where n is a predetermined integer), to determine the sound volume with reference to a predetermined table or the like on the basis of information about this n-time history, and to generate sound signals having the volume thus determined.

It is described here that the process can be performed, for example, every time (every 1/60 of a second) a command that can be inputted is issued every 1/60 of a second, but the process may also be carried out intermittently, such as, e.g., every 1/30 of a second. In this case, the inputted vibration commands are sampled and retrieved every $\Delta t$ seconds, for example, and sound signals that correspond to vibration commands continuously issued m times ($\Delta t/(1/60 \text{ sec})$=m times), i.e., in a period of $\Delta t$ seconds, are continuously generated based on the retrieved vibration commands. During time periods of no sampling, sound signals created based on the previously sampled vibration commands may be continually emitted as a sound.

Thus, according to the present embodiment, sounds can be emitted in the controller devices 2, and the players can experience realistic sounds.

A case was described herein in which the controller device 2 included a woofer speaker 24 and a tweeter speaker 25, but the controller device may also have three or more speakers. Furthermore, the combination of speakers is not limited to this option alone, and speakers having various frequency characteristics may be arbitrarily combined, such as full-range speakers, super woofers, woofers, squawkers, tweeters, super tweeters, and the like.

The controller device 2 may also include switches or adjustable resistors or the like for turning speakers on and off and controlling the volume of speakers that include a woofer speaker 24 and tweeter speaker 25.

The invention claimed is:

1. A controller device connected to a main body of an information processing apparatus, said controller device comprising:
a speaker for emitting a sound signal during a first communication cycle and a second communication cycle;
a communication unit for receiving first sound data from the main body of the information processing apparatus during the first communication cycle and second sound data during the second communication cycle;
a storage unit for retaining the first sound data and the second sound data;
a control unit for outputting sound data components from the first sound data to cause the speaker to emit the sound signal during the first communication cycle and to continue causing the sound signal to be emitted by the speaker during the second communication cycle when the second sound data is not transferred during the second communication cycle,
wherein the first sound data is sufficient for continuing to cause the sound signal to be emitted by the speaker during the second communication cycle.

2. The controller device of claim 1, said controller device further comprising:
a first speaker for emitting the sound signal in a low frequency range; and
a second speaker for emitting the sound signal in a frequency range that is higher in comparison with the first speaker.

3. The controller device of claim 2, wherein
a sound data signal is received from the main body of the information processing apparatus; and
the sound data signal thus received is used as a common signal source for the first and second speakers.

4. The controller device of claim 3, wherein
sound data signals that include a plurality of channels are received from the main body of the information processing apparatus; and
sound data signals of mutually different channels included in the sound signals are used as a signal source for the first and second speakers.

5. The controller device of claim 2, further comprising:
means for receiving a music signal that includes at least one option selected from a note interval, note length, note intensity, and note variety from the main body of the information processing apparatus, and synthesizing a sound on the basis of the music signal, wherein at least one speaker selected from the first speaker and the second speaker is made to emit sounds on the basis of the synthesized sound.

6. The controller device of claim 2, further comprising:

means for receiving a signal that includes at least note variety from the main body of the information processing apparatus, and synthesizing sound by using waveform data stored in advance in accordance with the note variety.

7. The controller device of claim 2, wherein a sound emission of the first speaker is selectively controlled according to instructions inputted from the main body of the information processing apparatus.

* * * * *